United States Patent [19]

Stacy, Jr.

[11] 4,070,974
[45] Jan. 31, 1978

[54] DISC TRENCH FILLER FOR A NO-TILL PLANTER

[76] Inventor: Hugh E. Stacy, Jr., Rte. No. 2, Lowellville, Ohio 44436

[21] Appl. No.: 700,975

[22] Filed: June 29, 1976

[51] Int. Cl.² ............................................. A01C 5/06
[52] U.S. Cl. ...................................... 111/85; 111/81; 172/538; 172/555
[58] Field of Search ...................... 111/77, 78, 85, 81, 111/88, 24, 84, 87, 79, 1; 172/538, 555, 604; 222/177; 37/142.5

[56] References Cited

U.S. PATENT DOCUMENTS

| 2,847,924 | 8/1958 | Quick | 172/555 |
| 3,023,718 | 3/1962 | Sorensen et al. | 111/85 |
| 3,673,970 | 7/1972 | Hatcher | 111/85 |
| 3,701,327 | 10/1972 | Krumholz | 111/85 X |
| 3,841,529 | 10/1974 | Hatcher | 222/177 |

FOREIGN PATENT DOCUMENTS

| 594,274 | 3/1960 | Canada | 111/1 |
| 1,338,241 | 12/1963 | France | 111/85 |
| 816,030 | 7/1949 | Germany | 111/85 |
| 1,247,031 | 9/1971 | United Kingdom | 111/85 |

*Primary Examiner*—Edgar S. Burr
*Assistant Examiner*—Steven A. Bratlie
*Attorney, Agent, or Firm*—Webster B. Harpman

[57] ABSTRACT

A disc-like device, the peripheral edge of which is formed in a plurality of oppositely turned curved segments is attached to a no-till planter as used in planting seed crops in fields which have not been plowed. The disc-like device is arranged to follow the disc opener of the planter which in turn follows a wavey disc which prepares the soil for the disc opener. The configuration of the disc-like device with its outturned oppositely arranged curved segments forming its peripheral edge closes the shallow trench formed by the disc opener at the time the seeds are inserted therein.

3 Claims, 3 Drawing Figures

U.S. Patent        Jan. 31, 1978        4,070,974
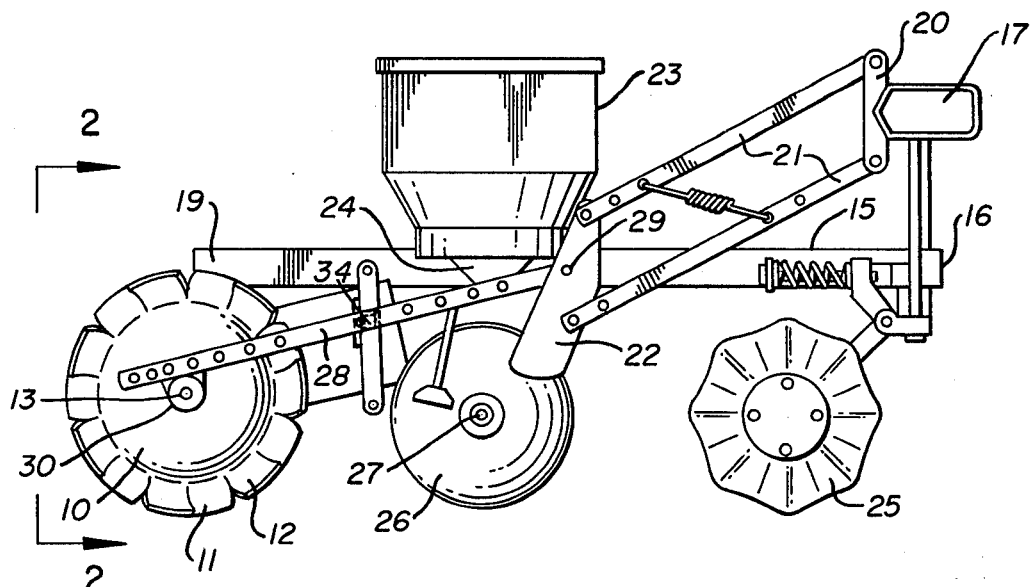
FIG. 1
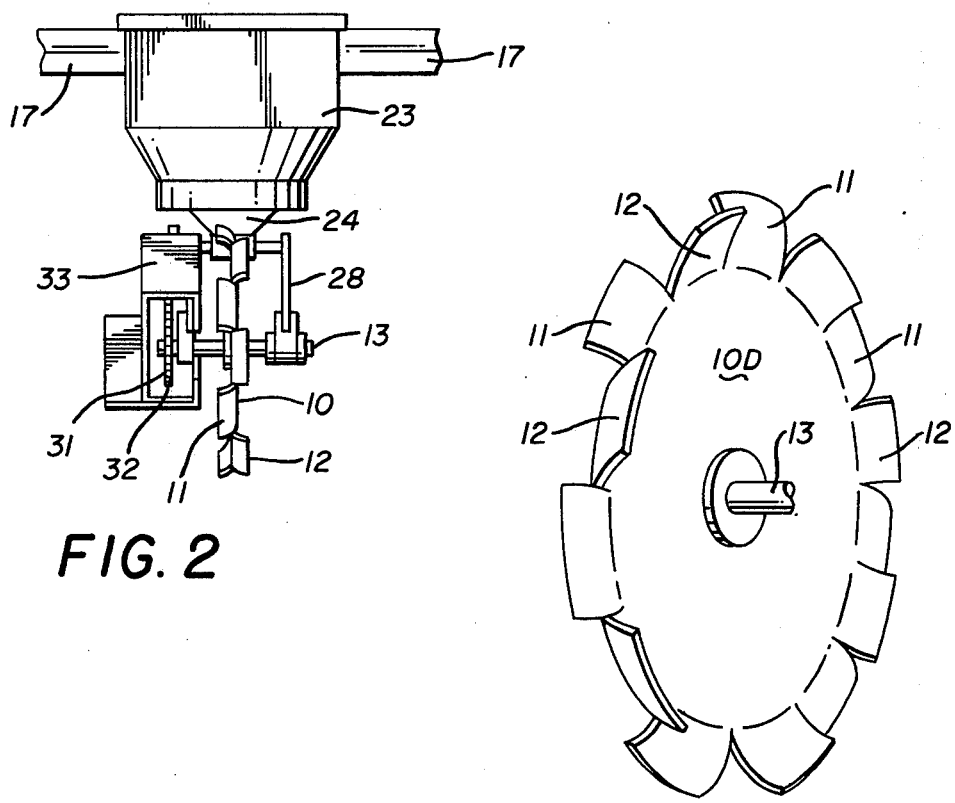
FIG. 2
FIG. 3

DISC TRENCH FILLER FOR A NO-TILL PLANTER

BACKGROUND OF THE INVENTION

1. Field of the Invention

This invention relates to no-till planters and attachments thereto for closing the shallow trench formed by the planter when seeds are planted thereby.

2. Description of the Prior Art

Prior no-till planters have depended upon the positioning of the seed by the disc opener and the formation of the same in a thin, shallow tapered configuration so that the walls of the shallow trench formed thereby fall inwardly upon themselves and the seeds. In some soils this self-closing of the shallow trench in which the seeds are planted works satisfactorily. In other soils, as for example clay soils, the consistency of the soil is such that it does not fall inwardly and birds and sometimes rodents eat the exposed seeds. The present invention provides a positive means of spooning portions of the side walls of the shallow trench into the area of the trench so as to effectively and completely cover the seeds therein.

SUMMARY OF THE INVENTION

A disc trench filler for a no-till planter takes the form of a disc-like device having a plurality of outturned individual curved segments in its peripheral edge, each of the segments being curved and the disc is arranged in following relation to the disc opener of the no-till planter so that the segments continuously engage the opposite sides of the shallow trench formed by the disc opener when it deposits the seeds and moves the soil into the shallow trench.

In the preferred embodiment the disc-like device is connected by mechanical means to the metering hopper of the planter so that a positive metering action is obtained and uniform spacing of the seeds being planted is realized. The individual segments in the periphery of the disc-like device are outturned alternately and curved so as to engage the edges of the shallow trench in a spoon-like action taking spoon size "bites" of the opposite walls of the shallow trench and pushing them into the same.

DESCRIPTION OF THE DRAWINGS

FIG. 1 is a side elevation of a no-till planter with the disc trench filler attached thereto;

FIG. 2 is a rear end elevation on line 2—2 of FIG. 1; and

FIG. 3 is an enlarged elevation of the disc-like device which forms the disc trench filler when attached to the no-till planter.

DESCRIPTION OF THE PREFERRED EMBODIMENT

In the form of the invention chosen for illustration herein, the disc trench filler takes the form of a disc 10 having a central aperture through which a supporting shaft 13 is positioned. This is best seen in FIG. 3 of the drawings and by referring thereto it will be observed that reinforcing rings are secured to the disc 10 adjacent the shaft 13 to lead strength thereto. The peripheral edge of the disc 10 is formed of a number of outwardly curved individual segments 11 and 12 respectively, each of the segments 11 and 12 being as thick as the disc 10 and substantially square in outline, the segments 11 curving outwardly in one direction and the segments 12 curving outwardly in an opposite direction. The segments 11 and 12 are alternately positioned in a circumferential pattern around the peripheral edge of the disc 10.

By referring now to FIG. 1 of the drawings it will be seen that a no-till planter, such as a corn planter, is disclosed and that it includes a frame 15, the forward end 16 of which is adapted to be towed as will be understood by those skilled in the art. A transverse hollow beam 17 is positioned crosswise above the forward end of the horizontal frame 15 and the opposite or rear end 19 of the frame 15 is provided with a ground engaging wheel all as will be understood by those skilled in the art.

The transverse hollow beam 17 has several transversely spaced brackets 20 with pairs of support arms 21 pivoted thereto and extending rearwardly therefrom and engaged at their rearmost ends on a pair of junction plates 22 which form a mounting for a seed holding hopper 23 and its attendant metering device 24, all as will be understood by those skilled in the art.

Still referring to FIG. 1 of the drawings it will be seen that one of a plurality of wavey discs 25 is illustrated as being positioned in spring tensioned relation beneath the transverse hollow beam 17 and those skilled in the art will recognize that these wavey discs prepare the soil for the disc opener by working up the surface thereof and cutting through surface trash, etc.

The plates 22 heretofore referred to in addition to supporting the seed hopper 23 and the metering device 24 operationally position a disc opener 26 which is rotatably mounted on a shaft 27 and is arranged to open a shallow trench and deposit the seeds therein all as will be understood by those skilled in the art.

A pair of trailing arms 28 extend rearwardly from pivots 29 on the plates 22 and carry journals 30 in which the support shaft 13 heretofore referred to is rotatably positioned. The disc 10 is carried on the support shaft 13 and the oppositely arranged outturned segments 11 and 12 thereof are thus lined up directly behind the disc opener 26 which in turn follows one of the wavey discs 25.

Those skilled in the art will understand that a typical no-till planter has a plurality of hoppers and disc openers and therefore is provided with a matching plurality of disc trench fillers 10 as hereinbefore described.

By referring to FIG. 2 of the drawings, it will be seen that the partial rear elevation of a no-till planter illustrates one of the hoppers 23, one of the metering devices 24 and one of the disc trench fillers 10. By referring thereto it will be seen that the support shaft 13 is provided with a sprocket 31 over which a chain 32 is trained and that the same extends forwardly of the device to the metering mechanism 24 which is driven thereby so that the operation of the metering device in delivering seeds to the disc opener 26 is uniformly controlled by the rotary motion of the disc trench filler 10. A guard and cover 33 is positioned around the chain 32 and is carried on one of the trailing arms 28.

It will thus be seen that a no-till planter has been provided with the disc trench fillers of the present invention and the proper back filling of the shallow trench formed by the disc opener 26 thereby insured and that the arrangement is such that the rotational operation of the disc trench filler 10 actuates the metering device 24 on the hopper 23 to insure an even spacing of the seeds being planted, all of which is desirable.

It will occur to those skilled in the art that the curved configuration of the oppositely arranged segments 11 and 12 is both outwardly with respect to the plane of the disc 10 of which they form the peripheral edge and circumferentially so that they are somewhat spoon-shaped and capable of satisfactorily and efficiently moving the soil at the sides of the shallow trench into the trench. An adjustable tensioning device 34 is positioned between said planter and said trailing arms 28 so that the pressure engagement of the segments 11 and 12 of the disc 10 with the soil may be controlled.

Although but one embodiment of the present invention has been illustrated and described, it will be apparent to those skilled in the art that various changes and modifications may be made therein without departing from the spirit of the invention and having thus described my invention what I claim is:

1. In a no-till planter having a disc opener of a known width arranged to form a shallow trench in the soil of a field to be planted, a hopper and a metering device for delivering seeds from the hopper to the trench formed by the disc opener; support means extending outwardly from said planter, a trench filler comprising a unitary disc journaled on said support means in trailing alignment with said disc opener, said disc having a peripheral edge, a plurality of individual alternately arranged opposite outwardly curving segments each integrally joined to the peripheral edge of said disc at the root of said segment, said segments each being curved in at least two planes and each being located immediately adjacent one another with said disc peripheral edge being formed entirely by said segment roots and adjacent segments are joined together solely at the roots thereof, the transverse spacing of the outermost edges of said curved segments being at least as great as the width of said disc opener and the shallow trench formed thereby so that the segments engage and move portions of the soil from the sides of the trench into the same.

2. The improvement in a no-till planter set forth in claim 1 and wherein said support means comprises a pair of trailing arms, pivots attaching said trailing arms to said planter adjacent said hopper and means on said planter adjustably engaging said trailing arms in spaced relation to said pivots.

3. The improvement in a no-till planter set forth in claim 1 and wherein said plurality of individual alternately arranged opposite outwardly curving segments are initially defined in the periphery of said disc by a plurality of slits extending radially of said disc.

* * * * *